July 28, 1959 H. SVANOE 2,897,053
WET PROCESS FOR PHOSPHORIC ACID MANUFACTURE
Filed Feb. 26, 1954
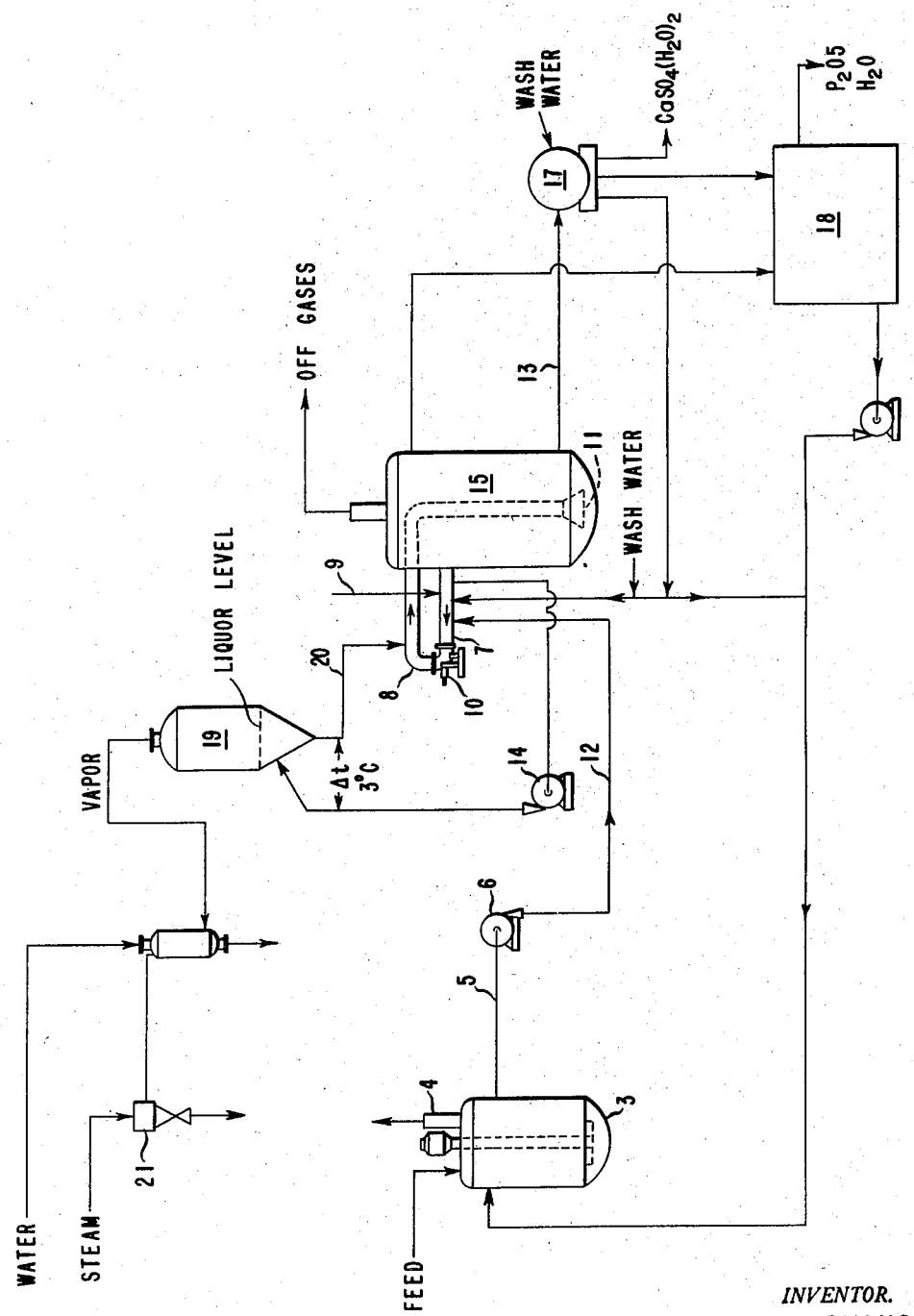
INVENTOR.
HANS SVANOE
BY
ATTORNEY

2,897,053

WET PROCESS FOR PHOSPHORIC ACID MANUFACTURE

Hans Svanoe, Warren, Pa., assignor to Struthers Wells Corporation, Warren, Pa., a corporation of Maryland Application February 26, 1954, Serial No. 412,883

4 Claims. (Cl. 23—165)

This invention is directed to a process for the manufacture of phosphoric acid from phosphate rock and like sources of phosphorus by the so-called wet process and is directed more particularly to controlling the addition of inorganic acids to the reaction mixture to facilitate separation of calcium salt crystals such as calcium sulfate from that mixture.

Present methods for the production of phosphoric acid in the wet way are usually characterized by a preliminary conversion of phosphatic material to crude phosphoric acid by treatment of the raw material with sulfuric acid. The subsequent purification necessary is attended with many difficulties, and such processes are further disadvantageous by reason of the extensive concentration operations necessarily applied to the phosphoric acid to obtain a product suitable for commercial use.

Many and various attempts have been made to accomplish rapid settling of calcium sulfate to increase the efficiency of calcium sulfate filtering operations as well as other operations used in the wet process. These attempts have met with but a moderate degree of success because of the inability of prior art investigators to devise a process for precise control of calcium sulfate precipitation and the inadequacy of the filtration equipment available.

A Swiss company, Kunstdüngen Patent Verwertungs A.G., and a Swedish group, Kemiska Patenter, have been working intensively on this problem in conjunction with interests in this country, and, although these efforts have improved the process heretofore in use, their efforts have resulted in a process that still requires the use of such elaborate equipment that costs of phosphoric acid and by-products of the process have remained far higher than the costs of the basic raw materials justify.

An object of the present invention is to provide an improved process for the preparation of phosphoric acid from phosphatic material. Another object is to provide such a process wherein the temperature gradient caused by the addition of an inorganic acid to phosphatic materials is reduced to a minimum. Yet another object is to provide an efficient method of forming calcium sulfate crystals of such size and form that they can be rapidly separated by washing from the mother liquor without caking on the filters. Still another object is to provide means for forming the aforesaid crystals under constant environmental conditions. Other objects and advantages of the invention will hereinafter appear.

The advantages and other features of the invention are many. Some are set forth in this general description of the process, while other features will be more specifically set forth hereinafter with reference to the attached diagrammatic flowsheet of the process. In the manufacture of phosphatic fertilizers from phosphate rock in accord with the invention, the rock is prepared by wet grinding in phosphoric acid, and preferably in a part of the produced phosphoric acid liquor. Subsequent to the grinding and solution of the rock by the liquor, there is added a precipitant or reactable liquid reagent to precipitate the calcium cation with a suitable anion to convert the phosphate solution to phosphoric acid. The crystal form of the precipitate determines in large measure the effectiveness of the process, the economy of its operation and the size of the equipment necessary to operate the process.

The precipitant commonly used is sulfuric acid which gives calcium sulfate as the precipitate. The chemical form of the precipitated calcium sulfate, whether as hemi-hydrate ($CaSO_4 \cdot \tfrac{1}{2}H_2O$), gypsum ($CaSO_4 \cdot 2H_2O$), or as an anhydrite ($CaSO_4$) is dependent on the temperature and concentration of the solution or both. In addition, the crystal size and habit are governed, inter alia, by the degree of supersaturation of the solution, the nuclei present in the reaction mixture, the concentration of solution, ratio of nuclei to salt concentration, time of contact, and mobility of the slurry. By and only by proper selection of not only the chemical form but also the crystal habit is it possible to produce a crystal that can be readily separated from the supersaturated reaction mixture, and after separation cleanly and efficiently washed free of the mother liquor, which is the concentrated reaction mixture.

The invention will be more fully appreciated by reference to the attached diagrammatical flow sheet of the invention in which phosphate rock, pebble phosphate, rock acid slurry and/or any suitable type of phosphatic material is treated with phosphoric acid and the resulting reaction product further treated with sulfuric acid in accord with these general chemical reactions:

(1) $Ca_3(PO_4)_2 + 4H_3PO_4 = 3CaH_4(PO_4)_2$
(2) $3CaH_4(PO_4)_2 + 3H_2SO_4 = 3CaSO_4 + 6H_3PO_4$

It is, of course, understood that other reactions also take place due to the multiplicity of impurities present in the phosphate rock. The principal Reactions 1 and 2, however, are of primary importance to the process of this invention.

The diagrammatical flowsheet illustrates the simplicity of equipment that is used for the invention. The quantities and reactants given illustrate a preferred operation of the process. In reactor 3 Reaction 1 is conducted. In crystallizer 15 the suspension and growth of the salt crystals are controlled to give a size and crystal form that can be easily separated and washed. It should be noted that Reaction 2 is started in a stream of liquor withdrawn from the crystallizer 15 and after the addition of the materials returned to the crystallizer 15. By means of these and other suitable equipment, operated as hereinafter described, a highly efficient process for the manufacture of phosphoric acid and by-products is provided.

Reaction 1 is carried out in the stirred reactor 3 into which ground phosphate rock or any other suitable form of this or similar phosphatic material is mixed and dissolved with an excess of phosphoric acid, preferably to give a product in which 35% to 40% by weight of the total $P_2O_5$ present after solution is present as monocalcium phosphate. Solution is facilitated by efficient stirring. Gases produced are discharged through vent 4 to a scrubbing tower not shown. Sufficient phosphoric acid is added to keep all the monocalcium phosphate in solution, the hold-up time in reactor 3 being ample to insure solution of the rock disregarding impurities.

The product of Reaction 1 leaves reactor 3 through pipe 5 and is forced by pump 6 into the crystallizer 15 through pipes 7 and 8. Sulfuric acid (of suitable concentration) is added to the solution from supply line 9 as the product of Reaction 2 flows through pipe 7 wherein Reaction 2 takes place. The calcium sulfate formed is held in solution in the supersaturated state, and the resulting solution is then forced by pump 10 through pipe 8 into the bottom of the crystallizer 15 from the open end 11 of pipe 8. The addition of monocalcium phosphate solution from pipe 12 and/or sulfuric acid from line 9 can be made before or after the solution passes pump 10.

Crystals formed in crystallizer 15 are drawn from a section near the bottom through pipe 13 and separated from the mother liquor on the filter 17, the mother liquor being collected in the receiving tank 18 from which the phosphoric acid product can be delivered to storage. A portion of the phosphoric acid in tank 18 is used to treat the phosphate rock as previously described.

The crystals on filter 17 can be washed with water and the wash water used for treatment of the phosphate rock in reactor 3 and/or returned to crystallizer 15.

Means are provided (a vacuum evaporation means 19 with steam ejector 21 and usual auxiliary equipment is illustrated in the flow sheet, although any other suitable means, such as external or internal cooling, may be used), to cool and preferably to concentrate a portion of the suspension liquid from crystallizer 15. The suspended liquid is drawn from pipe 7 by pump 14 and passed into evaporator 19 which is operated under a vacuum. The concentrated and cooler liquid is returned by pipe 20 to pipe 8. This cooling effect is so regulated and controlled that when the reaction mixture in pipe 8 is returned to the crystallizer 15 its temperature and its concentration do not significantly disturb the crystallization conditions in crystallizer 15 and principally do not to any material degree disturb the temperature and concentration that exists therein. These conditions more fully described hereinafter are adjusted to provide the chemical as well as physical form of the crystals to be made containing the calcium and sulfate ions.

While the drawing illustrates a preferred method of cooling and concentrating a portion of the suspensoin recycle, other methods may be used that provide a means of removing the exothermic heat of Reaction 2 from that reaction mixture prior to its introduction into the suspension in crystallizer 15. Removal of this heat prevents local superheating and resultant formation of very small crystals as well as undesired forms of calcium sulfate.

When the sulfuric acid and the calcium phosphate-phosphoric acid solution from Reaction 1 are added to the recycled suspension a certain amount of calcium sulfate supersaturation is automatically produced. The method used for the combining of these raw materials is an important feature of the invention. By adding the components to the mixture in the proper ratio, the calcium sulfate will not immediately precipitate but will remain dissolved in the circulating stream giving a supersaturated solution. For this and other reasons it is important that the sulfuric acid be added in slight excess, say 1% to 2% over that stoichiometrically required for Reaction 2.

By operating the process as described, a solution is produced that is supersaturated to a slight degree above that maintained in crystallizer 15. This increase in supersaturation is released on the crystals that are suspended in the crystallization chamber 15 preferably maintained at a temperature between 65° C. and 90° C., and is such a low degree of supersaturation that it does not alter the chemical and physical character of the crystals forming therein. The degree of supersaturation so provided is between about 0.5 and 5.0 grams of calcium sulfate per liter above that maintained in said crystallizer. The amount of impurities in the raw materials will affect crystallization characteristics of the calcium sulfate and will also, to a certain extent, determine the degree of supersaturation and amount of circulation required. The circulation of liquor from the bottom of pipe 8 should be between about 30 to about 200 gallons per minute per pound of calcium sulfate produced per minute.

Furthermore, the industrial stable supersaturation, i.e. the percentage of the solid in solution above that required for saturation, should also be strictly controlled within fairly narrow limits. For preferred operation it is advisable to maintain the calcium sulfate supersaturation during crystallization between about 10% to about 30% by weight, i.e. above its solubility, calculated on the solubility of the calcium sulfate in the particular solution. The supersaturation can be maintained, for example, by proportionating the circulating mother liquor to raw materials.

The monocalcium phosphate produced in reactor 3 will reduce the solubility of calcium sulfate from as much as about 12 to 14 grams per liter, which is approximately the concentration of that salt in the aqueous phosphoric acid produced by the process, to as low as 1 to 2 grams per liter, approximately the solubility after Reaction 1. Consequently, in the cyclical process of the invention the efficient separation is dependent in no small degree on the passing of the aqueous phosphoric acid solution carrying its calcium sulfate load from a range of high solubility in the crystallizer 15 to a range of low solubility in the reactor 3.

It is important, furthermore, that sufficient time be provided for the supersaturation produced by the addition of sulfuric acid to be released on the crystals suspended in the mother liquor in the crystallizer 15, so that when the circulating liquor again arrives at the mixing point in pipe 8, a substantial part of the supersaturation of the solution leaving pipe 11 will have been released. The average retention time of any given crystal within the crystallizer 15 should not be less than two hours and is preferably between four and six hours.

The process of the invention produces crystals that can be easily filtered, centrifuged or otherwise separated from the mother liquor. They are larger and more uniform than the calcium sulfate crystals produced by the processes in general use today and are substantially free from caking. Although the addition of sulfuric acid to the phosphate rock-phosphoric acid solution gives a highly exothermic reaction, the cooling effect provided on the recycled liquors is such that on return to the crystallizer 15 the stream of reaction products from Reaction 2 is substantially at the temperature maintained in crystallizer 15 which is to a large extent responsible for the improved crystal formation.

More specifically, an important feature of the invention resides in producing the supersaturation of the calcium sulfate containing crystals in pipe 8 by adding the reaction product of Reaction 1 and sulfuric acid to the circulating mother liquor in prescribed proportions. These materials should be added in such proportions to the circulating mother liquor that the crystals will not immediately form by crystallizing from the circulating liquor but the salt will remain dissolved therein to give a supersaturated solution. The ratio can vary through fairly wide limits but preferably is maintained between 1000 to 1500 parts by weight of mother liquor per part of calcium sulfate produced by Reaction 2. By adding sulfuric acid in amounts to react stoichiometrically with the monocalcium phosphate produced by Reaction 1, and to the extent stated supra, the recycled portion of mother liquor at any one time will have an increase in supersaturation to a relatively slight degree, generally between 0.5 to 5.0 grams per liter over the grams per liter at saturation in the circulating liquor under the temperature of the liquor after the addition of the sulfuric acid or other anion. Production of a slightly supersaturated solution in the recycling mother liquor is released to a sufficient degree in the crystallizer 15 to give excellent crystal growth and the desired crystal form. The highly exothermic Reaction 2 can therefore be carried out without disturbing the delicately balanced preferred crystallization conditions of the suspension of crystals in crystallizer 15.

The most satisfactory method of removing the heat from the reaction mixtures of Reactions 1 and 2, which is close to 1000 B.t.u. per pound of $P_2O_5$ produced as phosphoric acid, is illustrated in the drawing. A separate liquor stream is removed from the crystallizer 15 at any suitable point but before the addition of sulfuric acid and monocalcium phosphate solution to the recycled liquor. This liquor is pumped by pump 14 into vaporizer 19, where the reaction heat is removed by vaporizing an amount of water the heat of vaporization of which is equivalent to the amount of reaction heat. Due to the fact that calcium sulfate has a positive solubility increase with temperature in this liquor, it is important that the temperature decrease in the separated liquor is such that the liquor is maintained in the metastable zone wherein excessive formation of nuclei is prevented. Hence fewer and larger crystals are formed. With operation in the crystallizer at temperatures between 65° C. and 85° C., reaction heat is removed by maintaining temperature drop of the liquid to and from vaporizer 19 to between 2° C. to 5° C. and preferably between about 3° C. to 4° C., the cooled liquor as shown in the drawing being returned to the crystallizer 15. By so operating, the degree of supersaturation produced by mixing of the raw materials to produce Reaction 2 as well as the degree of supersaturation produced in the cooling cycle is of the same magnitude and in the region where excess nucleation is prevented.

One embodiment of the invention comprises feeding with an excess of phosphoric acid in accord with Reaction 1, 12,160 lbs./hr. of tricalcium phosphate calculated as tricalcium phosphate in phosphate rock to reactor 3 maintained at a temperature of 75° to 90° C. From reactor 3, line 5 carries (per 100 lbs. by weight of $P_2O_5$ as monocalcium phosphate) 155 lbs. $P_2O_5$ as carrier acid and 520 lbs. of water which are introduced into pipe 7 together with 11,500 lbs./hr. of sulfuric acid diluted with 235 lbs./hr. of water and recycled slurry from crystallizer 15, the crystallizer being maintained at a temperature of 65° to 80° C. The slurry removed from crystallizer 15 through line 13 contains 15 to 35% by weight of gypsum which is separated in filter 17 at the rate of 20,200 lbs./hr. calculated as $CaSO_4.2H_2O$. The filtrate from filter 17 is collected in tank 18 and the produced phosphoric acid is discharged from this tank at the rate of 5,600 lbs./hr. of $P_2O_5$ with 13,070 lbs./hr. of water.

The coarseness and uniformity of crystals produced in the crystallizer can be controlled within fairly wide limits such that rapid filtration, washing and separation from filter presses and centrifuges is a simple, inexpensive operation. The consistency of the slurry conducted to the filter can be between 15 to 30% crystal by weight. The phosphoric acid containing 25 to 35% $P_2O_5$ or even higher is conducted to other process operations and the necessary acid returned to the reactor.

Whereas, the process of the invention has been described primarily for Reaction 2 and with sulfuric acid as the acid reactant, mixtures of nitric and sulfuric acid may be used. Moreover, the calcium ion can be precipitated by some soluble sulfate salt such, for example, as ammonium-, sodium- or potassium sulfate and the same is the case with the monocalcium phosphate produced in the reactor which may be formed in accord with the processes of these reactions:

(3)   $Ca_3(PO_4)_2 + 6HNO_3 = 2H_3PO_4 + 3Ca(NO_3)_2$
(4)   $Ca(NO_3)_2 + (NH_4)_2SO_4 = 2NH_4NO_3 + CaSO_4$
(5)   $CaH_4(PO_4)_2 + M_2SO_4 = 2MH_2PO_4 + CaSO_4$ in which M may be Na or K.

However, the process of this invention whereby supersaturation caused by the acid addition is effected outside the major crystallization zone makes it possible to carry out such processes more continuously and efficiently than has heretofore been possible.

I claim:

1. In a process for the preparation of phosphoric acid from phosphate containing rock and sulfuric acid the steps which comprise reacting phosphate rock with phosphoric acid substantially in accord with this reaction:

(1)   $Ca_3(PO_4)_2 + 4H_3PO_4 = 3CaH_4(PO_4)_2$ thereafter reacting the resulting reaction mixture with sulfuric acid substantially in accord with this reaction:

(2)   $3CaH_4(PO_4)_2 + 3H_2SO_4 = 3CaSO_4 + 6H_3PO_4$ forming a suspension of growing crystals of calcium sulfate in mother liquor from the reaction mixtures of Reactions 1 and 2, withdrawing a stream of mother liquor from the suspension, adding sulfuric acid and the reaction product of Reaction 1 to the withdrawn stream in such proportions that crystals of calcium sulfate will not immediately form by crystallizing from the stream, withdrawing a separate stream of mother liquor from the suspension, removing from the separate stream by vaporization an amount of water the heat of vaporization of which is equivalent to the amount of reaction heat of said Reactions 1 and 2, combining the thus treated streams and returning the combined streams to said suspension.

2. The process of claim 1 in which the degree of supersaturation in the withdrawn mother liquor after the addition of sulfuric acid is between 0.5 and 5.0 grams per liter of calcium sulfate greater than the supersaturation of the calcium sulfate in the suspension.

3. The process of claim 1 in which the suspension is maintained at a temperature between 65° C. and 85° C.

4. The process of claim 1 in which a portion of the withdrawn mother liquor is subjected to vacuum evaporation and the thus cooled solution returned to the suspension with the sulfuric acid-phosphoric acid-phosphate rock reaction mixture at substantially the temperature of the suspension.

References Cited in the file of this patent

UNITED STATES PATENTS

| | | |
|---|---|---|
| Re. 19,045 | Larsson | Jan. 16, 1934 |
| 1,667,549 | Hechenbleikner | Apr. 24, 1928 |
| 1,836,694 | Wadsted | Dec. 15, 1931 |
| 1,944,048 | Walker et al. | Jan. 16, 1934 |
| 2,049,032 | Weber et al. | July 28, 1936 |
| 2,233,956 | Moore | Mar. 4, 1941 |
| 2,531,977 | Hammaren et al. | Nov. 28, 1950 |